United States Patent
Boger

(10) Patent No.: US 8,655,494 B2
(45) Date of Patent: Feb. 18, 2014

(54) FLUID PROCESS CONTROL

(75) Inventor: Henry W. Boger, Foxboro, MA (US)

(73) Assignee: Dresser, Inc., Addison, TX (US)

( * ) Notice: Subject to any disclaimer, the term of this patent is extended or adjusted under 35 U.S.C. 154(b) by 654 days.

(21) Appl. No.: 12/204,635

(22) Filed: Sep. 4, 2008

(65) Prior Publication Data

US 2010/0057262 A1   Mar. 4, 2010

(51) Int. Cl.
G05D 7/06 (2006.01)

(52) U.S. Cl.
USPC ... 700/282; 137/487.5; 166/372; 166/250.15; 166/250.03; 702/50; 73/861; 62/141

(58) Field of Classification Search
USPC .......... 700/282; 137/487.5; 166/372, 250.15; 166/250.03; 702/50; 73/861; 62/141
See application file for complete search history.

(56) References Cited

U.S. PATENT DOCUMENTS

| | | | |
|---|---|---|---|
| 3,768,373 A | 10/1973 | Divigard | |
| 6,701,726 B1 | 3/2004 | Kolk et al. | |
| 6,758,277 B2 * | 7/2004 | Vinegar et al. | 166/372 |
| 7,363,941 B2 * | 4/2008 | Caprera | 137/614.11 |
| 7,445,716 B2 * | 11/2008 | Quintel et al. | 210/636 |
| 2002/0029883 A1 * | 3/2002 | Vinegar et al. | 166/250.15 |
| 2007/0288180 A1 | 12/2007 | Lull et al. | |

FOREIGN PATENT DOCUMENTS

| | | |
|---|---|---|
| EP | 0995578 A2 | 4/2000 |
| WO | WO 1998/15741 A1 | 4/1998 |

OTHER PUBLICATIONS

Invitation to Pay Additional Fees and Partial International Search Report for PCT/US2009/055516 mailed Nov. 11, 2009, 5 pages.
International Search Report & Written Opinion, International Application No. PCT/US2009/055516, Applicant Dresser, Inc., mailed Mar. 25, 2011, 20 pgs.

* cited by examiner

*Primary Examiner* — Tejal Gami
(74) *Attorney, Agent, or Firm* — Hiscock & Barclay LLP

(57) ABSTRACT

A fluid regulator characterization system can characterize the flow of a fluid regulator that results in response to a received control signal. The fluid regulator characterization system can use the characterization to achieve a linear fluid regulator flow gain over a full operating range (e.g., zero percent travel to one hundred percent travel) for the fluid regulator relative to the received control signal. A linear fluid regulator flow gain can improve process control and reduce process variability.

27 Claims, 4 Drawing Sheets

FLUID PROCESS CONTROL

BACKGROUND

This disclosure relates to process control, and, in particular to process control for fluids.

Fluid regulators (e.g., valves) are used in a wide variety of environments for both commercial and industrial applications. For example, fluid regulators can be used to regulate fluids in pipeline systems, chemical plants, and building environmental systems. Regardless of environment or application, many fluid regulators are controlled by some type of logic-driven controller, whether located with or remote from the fluid regulator. A controller allows a fluid regulator to be operated in an intelligent manner to achieve one or more defined performance measures (e.g., flow rate, pressure, temperature, level, energy efficiency, etc.).

A common type of controller operates in response to pneumatic control techniques. This type of controller often receives an external air supply and manipulates the air supply in response to electronic control signals to actuate the fluid regulator appropriately. Thus, a pneumatic controller is often said to include an electric-to-pressure converter that converts an electronic control signal to a corresponding pneumatic control pressure. Depending on the fluid regulator to be actuated, a pneumatic fluid regulator controller may also include a second pneumatic component. This second stage of the controller may amplify the pressure and/or volumetric flow rate of the output of the electric-to-pressure converter. Common devices for accomplishing this include a spool valve and a pneumatic relay.

The flow rate of a fluid through a pneumatically-controlled fluid regulator depends in part on the pneumatic control pressure, which, in turn, depends on the electronic control signal received by the electric-to-pressure converter. The relationship between the flow rate of the fluid regulator and the electronic control signal is often non-linear, such that a particular increase in control signal does not correspond to a first order increase in the flow rate of the fluid regulator.

SUMMARY

This specification describes technologies relating to process control. A fluid regulator characterization system can characterize the flow of a fluid regulator that results in response to a received control signal. The fluid regulator characterization system can use the characterization to achieve a linear fluid regulator flow gain over a full operating range for the fluid regulator relative to the received control signal.

In general, one aspect of the subject matter described in this specification can be embodied in methods that include the actions of determining a first characterization of a first fluid regulator flow relative to a control signal based on a standardized operating environment for a fluid regulator; receiving characteristics of a projected operational environment for the fluid regulator; generating a second characterization of a second fluid regulator flow relative to the control signal based on the first characterization and the received characteristics; and linearizing a fluid regulator flow gain relative to the control signal based on the second characterization. Other implementations of this aspect include corresponding systems, apparatus, and computer program products.

These and other implementations can optionally include one or more of the following features. The first fluid regulator flow can be a percent rated travel relative to a percent rated flow capacity. The first characterization and the second characterization can be over a full operating range for the fluid regulator, which can, for example, be defined by a minimum percent lift and a maximum percent lift. The second characterization of a second fluid regulator flow relative to the control signal can be a fluid regulator member travel relative to the control signal that linearizes the fluid regulator flow gain over a defined operating range. The fluid regulator member travel relative to the control signal can be determined based on a ratio of a first pressure differential across a fluid regulator relative to a second pressure differential across the fluid regulator.

The first pressure differential can be a pressure differential across the fluid regulator at a high flow rate, and the second pressure differential can be a pressure differential across the fluid regulator at a low flow rate. The ratio of the first pressure differential across the fluid regulator relative to the second pressure differential across the fluid regulator can be scaled based on an expansion factor ratio and an upstream pressure ratio. The expansion factor ratio can be a ratio of an expansion factor at the high flow rate relative to an expansion factor at the low flow rate.

Particular implementations of the subject matter described in this specification can be implemented so as to realize one or more of the following features. Fluid regulator flow can be linearized relative to a received control signal. A linear fluid regulator flow gain can improve process control and reduce process variability. Thus, more control can be achieved over a regulation system. The linearization can be determined and stored in a fluid regulator controller prior to fluid regulator installation. The linearization may be based on characteristics of the fluid regulator in a standardized operating environment and the projected operating environment.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Linearization of fluid regulator performance can be achieved by a regulation system including a controller that can position a fluid regulator member in response to a control signal such that the increase in flow through the fluid regulator (e.g., fluid regulator gain) is linear with respect to the increase in the control signal. In some implementations, the controller can be provided a characterization of the fluid regulator that facilitates a linear relationship between a received control signal and the fluid regulator flow. The characterization can be valid for a full operating range for the fluid regulator being controlled. Linearizing fluid regulator gain with respect to the control signal can simplify control of the regulation system, for example, by allowing an operator or control system to adjust a control signal in proportion to a target change in fluid regulator flow.

Figure 1:
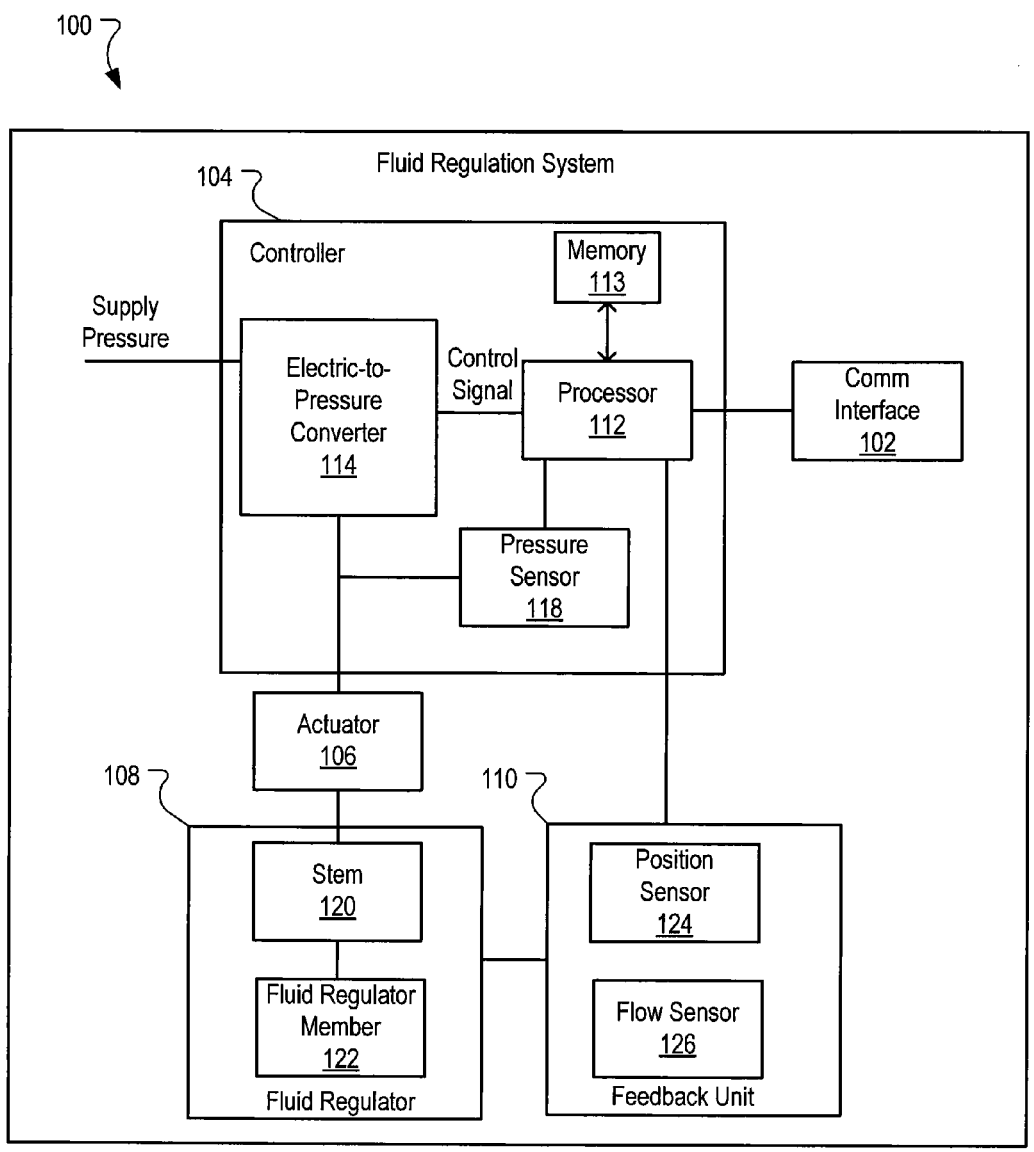
FIG. 1 is a block diagram of an example fluid regulation system.

FIG. 1 illustrates an example fluid regulation system 100. The regulation system 100 includes a communications interface 102, a controller 104, an actuator 106, a fluid regulator 108, and a feedback unit 110. The communications interface 102 can facilitate communications with an external device or system (e.g., control device or central control room, etc.). The communications interface 102 can be implemented, for example, as a modem, a network interface, a wireless interface, or any other appropriate device that can send and receive data. In some implementations, the communications interface 102 can receive control signals from a control device or control room and pass the control signals to the controller 104. Control signals can be, for example, electrical signals that can be varied (e.g., between 4-20 milliamperes) to control the flow through the fluid regulator, as discussed below.

The controller 104 includes a processor 112, memory 113, an electric-to-pressure converter 114, and a pressure sensor 118. The processor 112 can be a microprocessor, a microcontroller, or any other type of logic device. The processor can be coupled to the memory 113 to store received data. The memory 113 can be, for example, random access memory, read only memory, registers, or any other appropriate memory device. The memory 113 can store instructions for the processor 112, data related to control of the regulation system 100 (e.g., linearization information), or any other information. The processor 112 can receive data through the communications interface 102 and use the data to control the fluid regulator 108. The processor 112 can, for example, identify control signals in the received data and pass the control signal to the electrical-to-pressure converter 114.

The controller 104 may be any appropriate digital positioner. For example, the controller 104 may be an SVI 2AP positioner, available from Dresser-Masoneilan of Avon, Mass. The SVI 2AP positioner allows linear, percentage, and custom characterizations of valve/positioner characteristics (e.g., flow v. travel characteristics).

The electrical-to-pressure converter 114 receives an input pressure from an external pressure supply and controls an output pressure based on the control signal from the processor 112. The electrical-to-pressure converter 114 may, for example, include a magnetizable element (e.g., a flexure composed of a nickel-iron alloy) that is movable relative to an electric loop (e.g., a coil of copper wire). The movement of the magnetizable element can affect the output pressure of the electrical-to-pressure converter 114. For example, in response to an increasing control signal, the electrical-to-pressure converter 114 can increase the output pressure. In some applications, the electrical-to-pressure converter 114 can also include a pressure amplifier to amplify the output pressure (e.g., a relay).

The output pressure of the electrical-to-pressure converter 114 can be measured by a pressure sensor 118. The pressure sensor 118 can provide an electrical signal that corresponds to the output pressure of the electrical-to-pressure converter 114 to the processor 112. In turn, the processor 112 can make adjustments to the control signal to compensate for system variables that may affect the output pressure (e.g., pressure system leaks, temperature changes, etc.) differently over time. The pressure sensor 118 can be implemented, for example, as a piezo-type sensor.

The output pressure of the electrical-to-pressure converter 114 is received by the actuator 106. The actuator 106 can be implemented to include, for example, a piston subjected to differential pressure or a pressure-activated spring. The actuator 106 can adjust the position of the piston or pressure-activated spring in response to the control pressure. In turn, the actuator 106 can adjust the fluid regulator 108 to which it is connected, as described below.

The fluid regulator 108 includes a stem 120 and a fluid regulator member 122. The stem 120 may be, for example, a rod, shaft, or strut that is composed of metal or other appropriate material. The stem 120 can be connected to the actuator 106 and manipulated in response to adjustments to the position of a piston or a pressure-activated spring in the actuator 106. The stem 120 can be connected to the fluid regulator member 122 so that the fluid regulator member 122 is similarly manipulated in response to adjustments to the position of a piston or a pressure-activated spring in the actuator 106.

The fluid regulator member 122 regulates the flow of fluid (e.g., liquid or gas) through the fluid regulator 108. The fluid regulator member 122 can be manipulated, for example, to a fully closed position so that no fluid passes through the fluid regulator 108, to a fully open position so that a maximum flow of fluid is realized through the fluid regulator 108, or to any position between fully open and fully closed. The range of fluid regulator member positions from fully closed to fully open, inclusive, are referred to as the full operating range of the fluid regulator 108. The fluid regulator member 122 can be manufactured, for example, from plastic, metal, rubber, composite, and/or any other appropriate material. The fluid regulator member 122 can be a plug, a ball valve ball, a disc, or any other element that can regulate flow through a fluid regulator 108. When the fluid regulator member is a plug, the full operating range can be defined by a range that spans from a minimum percent lift to a maximum percent lift.

The feedback unit 110 can be connected to the fluid regulator 108 to monitor the position of the fluid regulator member 122 as well as the flow through the fluid regulator 108. The feedback unit 110 can include a position sensor 124 and a flow sensor 126. The position sensor 124 can determine the position of the stem 120 and provide the position of the stem to the processor 112. The position of the stem 120 correlates to the position of the fluid regulator member 122. Accordingly, the processor 112 can determine the position of the fluid regulator member 122 based on the position of the stem 120. The position sensor 124 can be, for example, an electrical, electromagnetic, optical, and/or mechanical element that is capable of determining a position of the stem 120. In particular implementations, the position sensor 124 is a Hall Effect sensor.

In some implementations, the flow sensor 126 can determine the flow of fluid through the fluid regulator 108 and provide an electrical signal corresponding to the flow rate to the processor 112. In other implementations, the electrical signal corresponding to the flow rate can be provided to a computing device in a control room. In turn, the processor 112 or computing device in the control room can adjust the control signal to the electric-to-pressure converter 114 in response to the actual flow when the actual flow does not correspond to a target flow. The adjustment of the control signal in response to the actual flow through the fluid regulator facilitates adjustments to the system due, for example, to system variables that affect the flow (e.g. changes in fluid regulator operation, temperature, humidity, material buildup in the fluid regulator, etc.).

As discussed, the flow through the fluid regulator 108 can be adjusted by the control signal that is received by the processor. However, in many situations, the relationship between an adjustment to the control signal and the resulting adjustment in fluid regulator flow is not linear. The non-linearity can result from the operating characteristics of each element in the system. For example, if the supply pressure to the electrical-to-pressure converter 114 varies, then the pressure received by the actuator 106 can vary. Similarly, if environmental conditions affect manipulation of the actuator 106, stem 120, or fluid regulator member 122, then the relationship between fluid regulator flow and control signal may not be linear.

While many of these operating characteristics can vary over time and can be compensated for through use of the pressure sensor 118 and the feedback unit 110, some non-linear characteristics are more difficult to correct. For example, characteristics of the fluid regulator 108 as installed can result in non-linear performance over the full operating range of the fluid regulator. In some situations, the fluid regulator 108 can be the most non-linear element of the regulation system 100. The magnitude of the non-linear fluid regulator performance variation can be high enough so that correction using the pressure sensor 118 and the feedback unit 110 is less efficient than correcting for the non-linearity in advance of fluid regulator operation. For example, in some operating ranges a small change in control signal at a control room can result in a large change in fluid regulator flow, whereas in other operating ranges a large change in control signal may result in a small change in fluid regulator flow. This can result in longer periods of time being required to achieve a target fluid regulator flow.

Typically, the performance of the fluid regulator 108 can be characterized prior to installation. For example, the performance can be characterized over the entire or full operating range of the fluid regulator. In turn, the characterization can be used to linearize the relationship between the control signal and the fluid regulator flow. By linearizing the relationship between the control signal and the fluid regulator flow, optimum process controller settings obtained at any signal level can be useful over the full signal range. This can result in improved process control and reduced process variability.

In some implementations, the relationship between the control signal and the fluid regulator flow can be linearized by determining the fluid regulator flow and fluid regulator member position at each control signal level and determining an offset for the fluid regulator member position that will result in a linear relationship between the fluid regulator flow and the control signal over the full operating range of the fluid regulator. This linearization determination can be performed, for example, through a computer-implemented routine based on characteristics of the fluid regulator 108 for a standardized operating environment (e.g., inherent flow characteristic) and a projected operating environment (e.g., installed flow characteristic). Additionally, the determination can be performed based on properties of the fluids that the fluid regulator 108 will regulate. This characterization can be performed, for example, by a fluid regulator characterization system.

The linearization disclosed above can be used, for example, to provide stability of a control system that would otherwise experience instability. Under classic Ziegler-Nichols tuning, for instance, controller gain is increased until constant instability occurs. Then, the gain is reduced to one-half of the value where constant instability occurred. But a valve having a gain of 0.5 at 80% of full signal will exhibit instability using the Ziegler-Nichols tuning method if the valve has a gain greater than 1.0 at any signal that is less than 50% of the full signal because the gain of the valve increases by more than a factor of two for any signal below 50% of the full signal. This can result in instability because control loop gain is the product of the gain of each element in a control loop. Thus, as valve gain increases, the control loop gain increases. However, if the valve gain can be linearized relative to the control signal (e.g., gain is approximately 1 from 0% full signal to 100% full signal), the control loop gain can be reduced.

Figure 2:
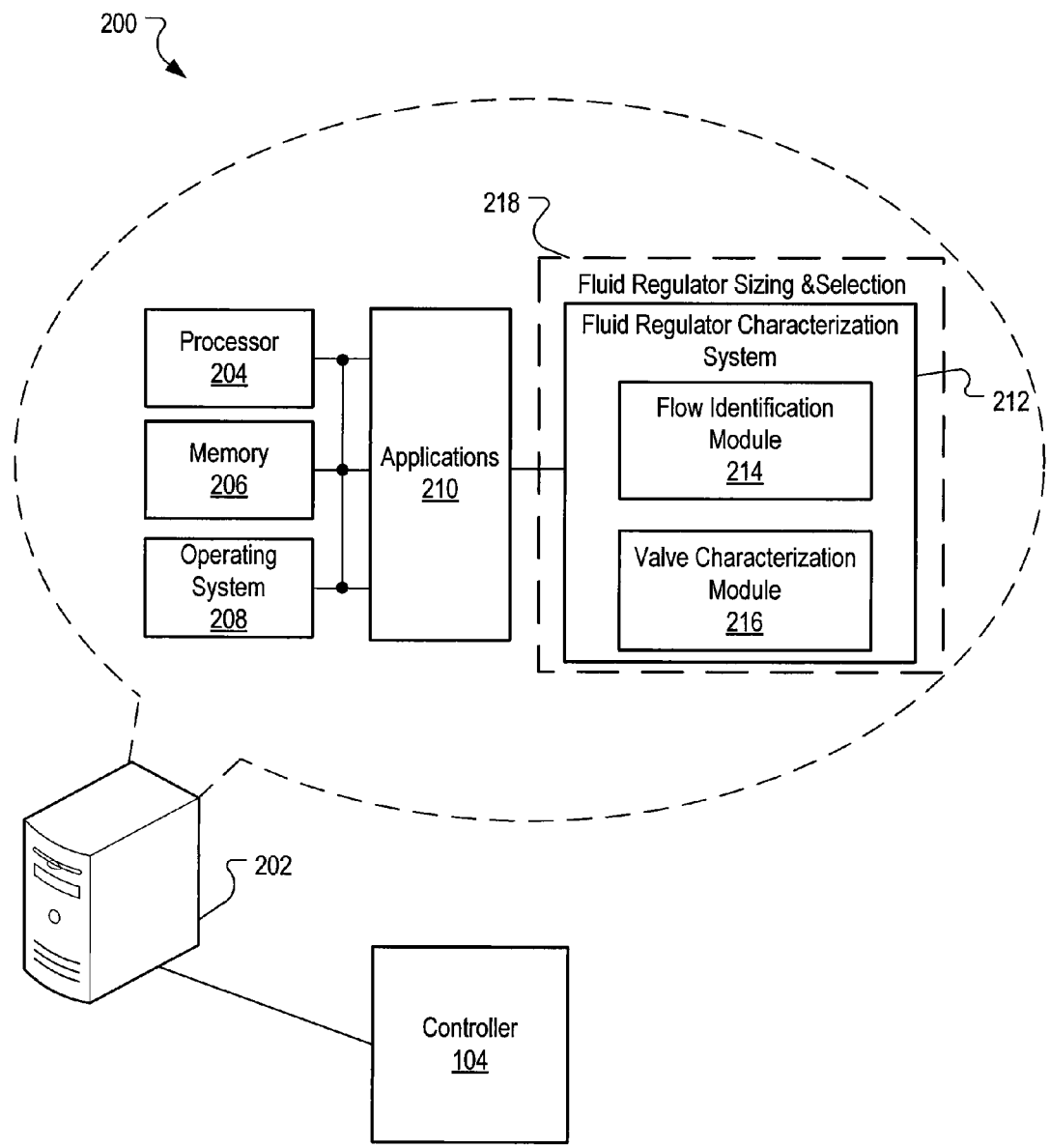
FIG. 2 is a block diagram of an example fluid regulator characterization environment.

FIG. 2 is a block diagram of an example fluid regulator characterization environment 200. The fluid regulator characterization environment 200 can be implemented, for example, in a computer 202. The computer 202 can include a processor 204 that processes data and executes instructions and applications within the computer. The processor can be coupled to memory 206 that can store the instructions for operation and data to be processed. An operating system 208 (e.g., Unix, Linux, or Windows) can be included that is responsible for managing activities performed by the elements and allocating resources to process data, perform instructions, and execute applications 210.

One application 210 that can be included in the computer 202 is a fluid regulator characterization system 212. In some implementations, the fluid regulator characterization system 212 can determine a linear characterization for a fluid regulator based on a standardized operating environment for the fluid regulator and a projected operating environment for the fluid regulator. The fluid regulator characterization system 212 can include a flow identification module 214 and a fluid regulator characterization module 216. The fluid regulator characterization system 212 can reside as an independent application 210 or as part of a fluid regulator sizing and selection application 218.

The fluid regulator sizing and selection application 218 can determine, for example, an appropriate fluid regulator to be used for a particular operating environment. Some sizing and selection programs determine an appropriate fluid regulator based on characteristics of an operating environment in which the fluid regulator will be used. Some characteristics that can be used to facilitate selection of a fluid regulator can include the fluid to be regulated (e.g., gas or liquid), an upstream pressure, a downstream pressure, a pipe size, a minimum flow, a normal flow, and a maximum flow. Other characteristics can be used depending, for example, on the sizing and selection program used and the application. Fluid regulator sizing and selection programs are well known by those of ordinary skill in the art.

In some implementations, the fluid regulator characterization system 212 can determine a linear characterization for a fluid regulator after the sizing and selection application 218 has selected an appropriate fluid regulator for the application. In other implementations, a user may specify a fluid regulator to be characterized. For example, the user may input a model number for a fluid regulator to be characterized through keyboard inputs, or the user may select the fluid regulator to be characterized from a dropdown or other selection tool.

Once the fluid regulator to be characterized is selected, the flow identification module 212 can determine characteristics for the fluid regulator based on a standardized operating environment. The standardized operating environment can be defined in part, for example, based on sixty degree Fahrenheit water flowing through the fluid regulator with a one pound per square inch constant pressure drop across the fluid regulator. An example characteristic that can be determined for the fluid regulator is a fluid regulator flow coefficient. The fluid regulator flow characteristic can be, for example, the amount (e.g., in U.S. Gallons) of the sixty degree Fahrenheit water that will flow through the fluid regulator in one minute. In the example standardized operating environment, the fluid regulator flow characteristic is sometimes called the inherent flow characteristic of the fluid regulator. This inherent fluid regulator flow characteristic can be determined across the entire operating range for the fluid regulator.

In some implementations, the inherent fluid regulator flow characteristic can be determined by accessing a lookup table provided, for example, by a fluid regulator manufacturer. In other implementations, the inherent fluid regulator flow characteristic can be determined by measuring the flow at the example standardized operating environment.

The inherent flow characteristic can be a measure of the flow of the fluid regulator relative to a percent travel of the fluid regulator member. The percent travel of the fluid regulator member is a measure of how open the fluid regulator is relative to a fully open position. For example, at ten percent travel, the fluid regulator member has opened ten percent relative to a fully open position for the fluid regulator member. Accordingly, the inherent flow characteristic can be determined or provided from zero percent travel to one hundred percent travel for a given fluid regulator.

As discussed above, the percent travel of a fluid regulator member is dependent on the magnitude of the control signal. Accordingly, the inherent flow characteristic can be determined relative to the control signal instead of the percent travel. For example, a conversion factor can be applied to the inherent fluid regulator flow characteristic at each point across the full operating range of the fluid regulator that reveals the inherent fluid regulator flow characteristic relative to the control signal. In some implementations, the conversion factor can be applied by the flow identification module 214. In other implementations, the inherent fluid regulator flow characteristic relative to the control signal can be retrieved from a look up in memory 206.

In some implementations, the flow identification module 214 can provide the inherent fluid regulator flow characteristic to the fluid regulator characterization module 216. In turn, the fluid regulator characterization module 216 can determine a first characterization of the fluid regulator based on the inherent flow characteristic. In some implementations, the first characterization can be a characterization that linearizes the fluid regulator flow relative to the control signal across the full operating range of the fluid regulator.

For example, the fluid regulator characterization module 216 can define a linear relationship between the inherent flow and the control signal and create a mirror image of the inherent fluid regulator flow characteristic about the defined linear relationship, as discussed in reference to FIG. 3 below. In some implementations, the linear relationship can be defined according to a line that connects a zero percent inherent fluid regulator flow at zero percent of a maximum control signal to a one hundred percent inherent fluid regulator flow at one hundred percent of the maximum control signal. In other implementations, regression or other statistical computations can be performed to define the linear relationship, and corresponding offsets can be applied to the inherent flow characteristic to realize the linear relationship. Once the linear relationship is defined, a mirror image of the curve can be created about the linear relationship. In turn, the coordinates of the mirror image curve can be used to determine the fluid regulator member percent lift that is required to realize the linear relationship.

Figure 3:
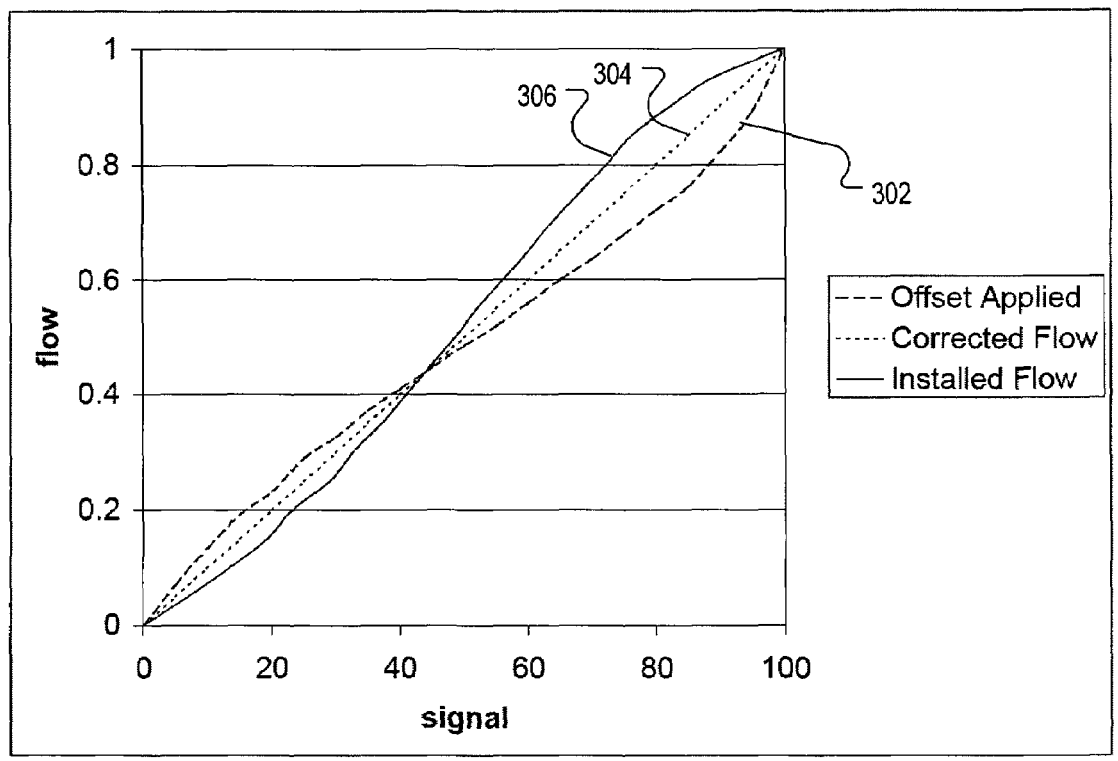
FIG. 3 is a graph illustrating an example linear characterization of a fluid regulator.

FIG. 3 is a graph illustrating an example linear characterization of a fluid regulator. As shown in FIG. 3, the curve 302 represents the inherent flow characteristic of the fluid regulator plotted relative to the percent maximum control signal. This curve can be constructed, for example, from the inherent flow characteristic data provided by the flow identification module.

The curve 304 represents a linear relationship between the inherent fluid regulator flow and the control signal. In this example, the linear relationship is determined by creating a linear curve between the inherent flow measure at zero percent maximum control signal and the inherent flow measure at one hundred percent maximum control signal.

Once the linear relationship is identified, an offset curve that can be used to realize the linear relationship can be represented by curve 306. As seen in FIG. 3, the curve 306 that represents the offset is a mirror image of curve 302 relative to curve 304. By applying the offset curve 306 to the curve 302, the relationship between the inherent fluid regulator flow and the control signal approximates curve 304. In some implementations, the offset curve 306 can be derived from a curve that results from plotting the percent of max control signal as a function of the percent inherent flow characteristic. In these implementations, if the percent max control signal relative to the percent inherent flow characteristic is stored in the memory 206 of FIG. 2, then the flow identification module 212 can retrieve this information and define it as the offset.

If the fluid regulator can be installed in the standardized environment discussed above (e.g., constant pressure drop across the fluid regulator), then the offset curve 306 can be used to linearize operation of the fluid regulator. However, in many situations, a fluid regulator will be installed in an operating environment that differs from the standardized environment. For example, in many installations, the pressure drop across the fluid regulator will vary according to a number of factors including the characteristics of the fluid flowing through the fluid regulator (e.g., liquid or gas), the other elements used in the regulation system, as well as the percent travel of the fluid regulator member. Therefore, a second characterization can be determined for the fluid regulator.

The second characterization of the fluid regulator can be a flow characteristic of the fluid regulator in the projected operating environment (e.g., installed flow characteristic). In some implementations, the second characterization can be determined based on the first characterization and characteristics of the fluid regulator in the projected operating environment in which the fluid regulator is to be installed (e.g., installed fluid regulator characteristics). The second characterization can be performed over the entire full operating range of the fluid regulator.

Referring again to FIG. 2, when a second characterization is performed by the fluid regulator characterization system 212, the flow identification module 214 can provide the installed fluid regulator characteristics to the fluid regulator characterization module 216. In situations where the installed fluid regulator characteristics are not provided, the installed fluid regulator characteristics can be determined by measuring the fluid regulator characteristics across the full operating range for the fluid regulator.

Installed fluid regulator characteristics can include, for example, the pressure differential across the fluid regulator (dP), the upstream pressure (P1), and the compression factor (Y), for a gas that is flowing through the fluid regulator. As discussed, in situations where these characteristics are not provided, they can be measured. These measurements can be performed by the flow identification module 214 in the environment in which the fluid regulator is installed and stored in memory 206. Additionally, the flow identification module 214 can provide the installed flow characteristic to the fluid regulator characterization module 216.

In some implementations, the fluid regulator characterization module 216 can use the first characterization and the installed fluid regulator characteristics to determine the second characterization. The second characterization can be determined, for example, according to the following equation:

$$SecondCharacterization = \frac{x * \sqrt{\gamma}}{\sqrt{1+(\gamma-1)*x^2}}$$

Where:
x=first characterization;
γ(liquid)=dP ratio=pressure drop across the fluid regulator at a max flow rate/pressure drop across the fluid regulator at a min flow rate; and γ(gas)=Yratio^2*dPratio*P1ratio;

Where:
Y ratio=compression factor at a max flow rate/compression factor at a min flow rate; and
P1 ratio=upstream pressure at a max flow rate/upstream pressure at a min flow rate.

Using the equation, the fluid regulator characterization module 216 can determine a percent travel for the fluid regulator member that results in a linear relationship between the installed flow of the fluid regulator relative to the control signal for each control signal value. In turn, the determined percent travel can be provided to the fluid regulator controller 104 at each control signal value so that a change in the control signal will result in a corresponding change in fluid regulator flow that is linear with respect to the control signal. The determined percent travel can be stored, for example, in the processor 112 of FIG. 1.

Figure 4:
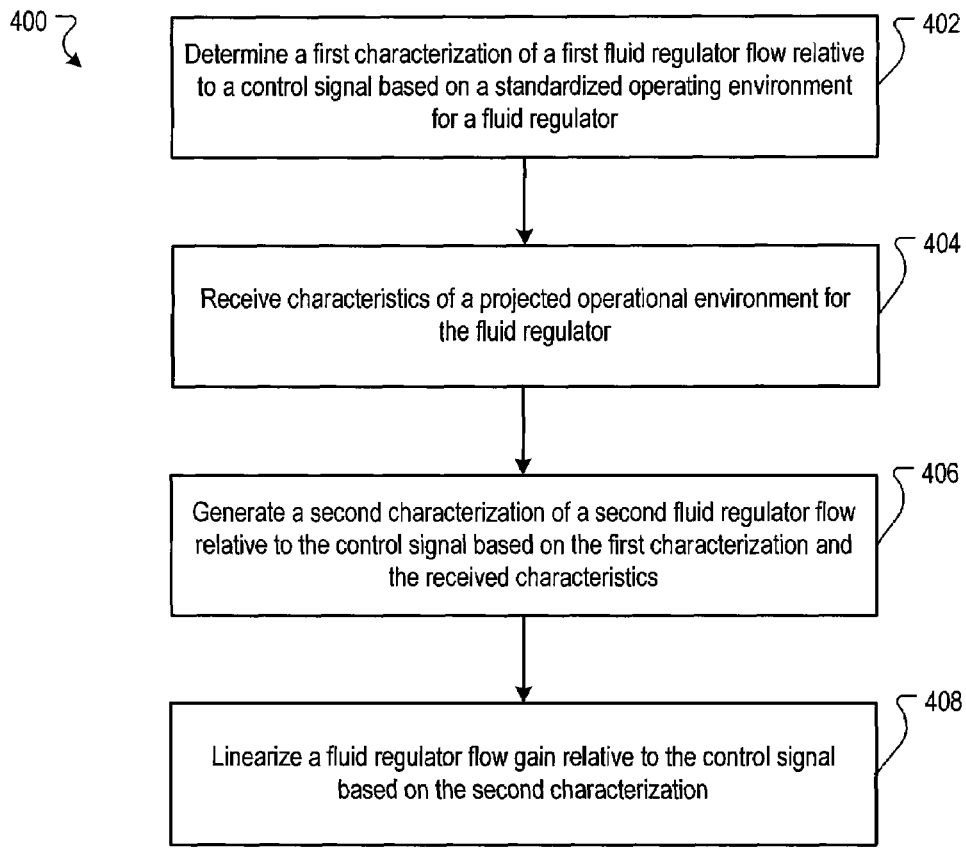
FIG. 4 illustrates an example process of linearizing a fluid regulator gain.

FIG. 4 illustrates an example process 400 of linearizing a fluid regulator gain. The process 400 can be implemented, for example, in the regulation system 100 or the fluid regulator characterization system 212.

Stage 402 determines a first characterization of a first fluid regulator flow relative to a control signal based on a standardized operating environment for a fluid regulator. In some implementations, the first fluid regulator flow can be an inherent fluid regulator flow coefficient for the fluid regulator. The inherent fluid regulator flow coefficient can be, for example, the amount of sixty degree Fahrenheit water that will flow through the fluid regulator in one minute with a one pound per square inch constant pressure drop across the fluid regulator. The first characterization can provide or lead to a linear relationship between the first fluid regulator flow and the control signal. The first characterization can be determined, for example, by the fluid regulator characterization system 212.

Stage 404 receives characteristics of a projected operational environment for the fluid regulator. In some implementations, the characteristics can be provided. In other implementations, the characteristics can be measured with the fluid regulator installed in the projected operational environment. The characteristics can be, for example, installed flow characteristics for the fluid regulator. The characteristics can be received, for example, by fluid regulator characterization system 212.

Stage 406 generates a second characterization of a second fluid regulator flow relative to the control signal based on the first characterization and the received characteristics. In some implementations, the second fluid regulator flow can be an installed fluid regulator flow. The installed fluid regulator flow can be, for example, the fluid regulator flow that is realized for the fluid regulator across the full operating range of the fluid regulator in the projected operational environment. For example, the projected operational environment can be defined in part by a pressure drop across the fluid regulator and an upstream pressure. If a gas, rather than a liquid, is traveling through the fluid regulator, then an expansion or compression factor can be used to further define the environment.

The second characterization can provide a percent travel for the fluid regulator member that corresponds to a fluid regulator flow that results in a linear relationship between the fluid regulator flow and the control signal across the full operating range of the fluid regulator. The second characterization can be determined, for example, by the fluid regulator characterization system 212.

Stage 408 linearizes a fluid regulator flow gain relative to the control signal based on the second characterization. In some implementations, the second characterization can be stored in a regulation system. The second characterization can be stored into the regulation system over an electrical, optical, wireless, or other appropriate communications interface. The electrical connection can be, for example, a distributed network communications interface (e.g., Local Area Network, Wide Area Network, Wireless Interface) or a direct communications interface (e.g., IEEE 1394, Universal Serial Bus, RS-232). In turn, the fluid regulation system 100 can manipulate a fluid regulator member such that a linear fluid regulator flow is realized relative to the control signal. The linearization can be realized, for example, by fluid regulator characterization system 212, and/or the fluid regulation system 100.

Figure 5:
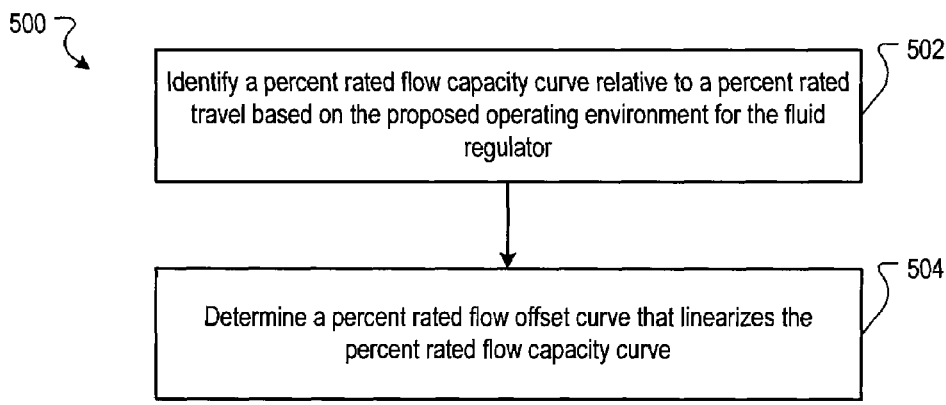
FIG. 5 illustrates an example process of determining a first characterization.

FIG. 5 illustrates an example process 500 of determining a first characterization. The process 500 can be implemented, for example, in the fluid regulator characterization system 212.

Stage 502 identifies a percent rated flow capacity curve relative to a percent rated travel based on the standardized operating environment for the fluid regulator. In some implementations, the percent rated flow capacity can be determined over the full operating range of the fluid regulator. The percent rated flow capacity can be, for example, the inherent flow of the fluid regulator. The identification can be performed, for example, by the flow identification module 214.

Stage 504 determines a percent rated flow offset curve that linearizes the percent rated flow capacity curve. In some implementations, the percent rated flow offset curve can be determined by creating a curve that mirrors the percent rated flow capacity curve relative to a linear curve. The linear curve can be defined, for example, as a linear curve that connects a percent rated flow value at a minimum control signal value and a percent rated flow value at a maximum control signal value, or otherwise linearizes a relationship between the percent rated flow and the control signal. The percent rated offset curve can be determined, for example, by the fluid regulator characterization module 216.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

A computer program (also known as a program, software, application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

While particular implementations of the subject matter in this specification have been described, other implementations are possible. For example, the actions described can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Although certain implementations have been described in detail and various others have been mentioned or suggested, those skilled in the art will readily recognize that other implementations are possible while still achieving fluid process control. Thus, the scope of the protected subject matter should be judged based on the following claims, which may encompass one or more aspects of one or more implementations.

What is claimed is:

1. A computer-implemented method, comprising:
    determining a first characterization of a first fluid regulator flow relative to a control signal for the fluid regulator, the characterization of the first fluid regulator flow based at least in part on operation of the fluid regulator in a standardized operating environment;
    receiving characteristics of a projected operational environment for the fluid regulator;
    generating a second characterization of a second fluid regulator flow of the fluid regulator relative to the control signal based at least in part on the first characterization and the received characteristics of the projected operational environment; and
    linearizing a fluid regulator flow gain of the fluid regulator relative to the control signal while the fluid regulator operates in an operational environment modeled by the projected operation environment, wherein linearizing of the flow gain relative to the control signal is based on the generated second characterization, wherein the second characterization is determined according to:

$$\text{Second Characterization} = \frac{x * \sqrt{\gamma}}{\sqrt{1 + (\gamma - 1) * x^2}},$$

wherein, for a liquid, x is the first characterization and γ is equal to a pressure drop across the fluid regulator at a max flow rate divided by a pressure drop across the fluid regulator at a min flow rate, and wherein, for a gas, x is the first characterization and γ is determined according to $$\gamma = Y\text{ratio}^2 * d\text{Pratio} * P1\text{ratio},$$

wherein dPratio is equal to a pressure drop across the fluid regulator at a max flow rate divided by a pressure drop across the fluid regulator at a min flow rate and P1 ratio is equal to an upstream pressure at a max flow rate divided by an upstream pressure at a min flow rate.

2. The method of claim 1, wherein the first fluid regulator flow comprises a percent rated travel relative to a percent rated flow capacity.

3. The method of claim 1, wherein the first characterization and the second characterization are over a full operating range for the fluid regulator.

4. The method of claim 3, wherein the full operating range for the fluid regulator is defined by a minimum percent lift and a maximum percent lift.

5. The method of claim 1, wherein determining a first characterization of a first fluid regulator flow comprises: identifying a percent rated flow capacity curve relative to a percent rated travel based on the standardized operating environment for the fluid regulator; and determining a percent rated flow offset curve that linearizes the percent rated flow capacity curve.

6. The method of claim 1, wherein generating a second characterization of a second fluid regulator flow relative to the control signal comprises determining a fluid regulator member travel relative to the control signal that linearizes the fluid regulator flow gain over a defined operating range.

7. The method of claim 6, wherein determining a fluid regulator member travel relative to the control signal comprises determining the fluid regulator member travel relative to the control signal based on a ratio of a first pressure differential across a fluid regulator relative to a second pressure differential across the fluid regulator.

8. The method of claim 7, wherein:
the first pressure differential comprises a pressure differential across the fluid regulator at a high flow rate; and
the second pressure differential comprises a pressure differential across the fluid regulator at a low flow rate.

9. The method of claim 7, wherein the ratio of the first pressure differential across the fluid regulator relative to the second pressure differential across the fluid regulator is scaled based on an expansion factor ratio and an upstream pressure ratio.

10. The method of claim 9, wherein the expansion factor ratio comprises a ratio of an expansion factor at the high flow rate relative to an expansion factor at the low flow rate.

11. A fluid regulator characterization system, comprising:
a flow identification module to identify a first fluid regulator flow of a fluid regulator based on a control signal for the fluid regulator operating in a standardized fluid regulator operating environment; and
a fluid regulator characterization module to determine a first characterization of a fluid regulator and a second characterization of the fluid regulator, the second characterization adapted for use in linearizing a fluid regulator flow gain of the fluid regulator relative to the control signal as the fluid regulator operates in a particular operational environment, wherein the first characterization is based on the first fluid regulator flow identified by the flow identification module and the second characterization is based on projected operational environment for a fluid regulator and the first characterization,
wherein the second characterization is determined according to:

$$\text{Second Characterization} = \frac{x * \sqrt{\gamma}}{\sqrt{1 + (\gamma - 1) * x^2}}, \text{ and}$$

wherein, for a liquid, x is the first characterization and γ is equal to a pressure drop across the fluid regulator at a max flow rate divided by a pressure drop across the fluid regulator at a min flow rate, wherein, for a gas, x is the first characterization and γ is determined according to $$\gamma = Y\text{ratio}^2 * d\text{Pratio} * P1\text{ratio},$$

wherein dPratio is equal to a pressure drop across the fluid regulator at a max flow rate divided by a pressure drop across the fluid regulator at a min flow rate and P1 ratio is equal to an upstream pressure at a max flow rate divided by an upstream pressure at a min flow rate.

12. The fluid regulator characterization system of claim 11, wherein the first fluid regulator flow comprises a percent rated travel at a percent rated flow capacity based on the standardized fluid regulator operating environment.

13. The fluid regulator characterization system of claim 12, wherein the first characterization comprises a first fluid regulator flow offset that linearizes the first fluid regulator flow over a defined operating range.

14. The fluid regulator characterization system of claim 11, wherein the second characterization comprises a fluid regulator member travel relative to the control signal that linearizes the fluid regulator flow gain over a defined operating range.

15. The fluid regulator characterization system of claim 14, wherein the fluid regulator member travel relative to the control signal is based on a ratio of a first pressure differential across the fluid regulator relative to a second pressure differential across the fluid regulator.

16. The fluid regulator characterization system of claim 15, wherein:
the first pressure differential comprises a pressure differential at a high flow rate; and
the second pressure differential comprises a pressure differential at a low flow rate.

17. The fluid regulator characterization system of claim 15, wherein the ratio of the first pressure differential relative to the second pressure differential is scaled based on an expansion factor ratio and an upstream pressure ratio.

18. The fluid regulator characterization system of claim 17, wherein the expansion factor ratio comprises a ratio of an expansion factor at the high flow rate relative to an expansion factor at the low flow rate.

19. The fluid regulator characterization system of claim 17, wherein the upstream pressure ratio comprises an upstream pressure at the high flow rate relative to the upstream pressure at the low flow rate.

20. A fluid regulator control system, comprising:
a pressure cavity to receive a pressure supply;
an electric-to-pressure converter connected to the pressure cavity to convert a control signal to a corresponding control pressure, wherein the control pressure corresponds to a travel of a fluid regulator member; and
a processor connected to the electric-to-pressure converter to i) receive a signal indicating a fluid regulator member position and to ii) position a fluid regulator member by generating the control signal based on the position signal and a characterization that linearizes a fluid regulator flow gain relative to the position signal across a full fluid regulator operating range based on a predetermined linearization of fluid regulator flow gain relative to the position signal in a standardized operating environment,
wherein the characterization uses a first characterization based on the first fluid regulator flow identified by the flow identification module and a second characterization determined according to:

$$\text{Second Characterization} = \frac{x * \sqrt{\gamma}}{\sqrt{1 + (\gamma - 1) * x^2}},$$

wherein, for a liquid, x is the first characterization and γ is equal to a pressure drop across the fluid regulator at a max flow rate divided by a pressure drop across the fluid regulator at a min flow rate, and
wherein, for a gas, x is the first characterization and γ is determined according to $$\gamma = Y\text{ratio}^2 * d P\text{ratio} * P1\text{ratio},$$

wherein dPratio is equal to a pressure drop across the fluid regulator at a max flow rate divided by a pressure drop across the fluid regulator at a min flow rate and P1 ratio is equal to an upstream pressure at a max flow rate divided by an upstream pressure at a min flow rate.

21. The fluid regulator control system of claim 20, wherein the characterization comprises a linear characterization of the fluid regulator flow gain based on a standardized fluid regulator operating environment and a fluid regulator flow relative to the control signal.

22. The fluid regulator control system of claim 21, wherein the fluid regulator flow comprises a percent rated travel relative to a percent rated flow.

23. The fluid regulator control system of claim 20, wherein the full fluid regulator operating range comprises a range from zero percent fluid regulator member travel to one hundred percent fluid regulator member travel.

24. The fluid regulator control system of claim 20, further comprising: a pressure amplifier connected to the electric-to-pressure converter to amplify the control pressure received from the electric-to-pressure converter; and a fluid regulator comprising the fluid regulator member.

25. A fluid regulator characterization device, comprising:
means for determining a first characterization of a first fluid regulator flow of a fluid regulator relative to a control signal for the fluid regulator, the characterization of the first fluid regulator flow;
means for receiving characteristics of a projected operational environment for the fluid regulator;
means for generating a second characterization of a second fluid regulator flow of the fluid regulator relative to the control signal based at least in part on the first characterization and the received characteristics of the projected operational environment,
means for linearizing a fluid regulator flow gain of the fluid regulator relative to the control signal while the fluid regulator operates in an operational environment modeled by the projected operation environment, wherein linearizing of the flow gain relative to the control signal is based on the second characterization,
wherein the second characterization is determined according to $$\text{Second Characterization} = \frac{x * \sqrt{\gamma}}{\sqrt{1 + (\gamma - 1) * x^2}},$$

wherein, for a liquid, x is the first characterization and γ is equal to a pressure drop across the fluid regulator at a max flow rate divided by a pressure drop across the fluid regulator at a min flow rate, and
wherein, for a gas, x is the first characterization and γ is determined according to $$\gamma = Y\text{ratio}^2 * d P\text{ratio} * P1\text{ratio},$$

wherein dPratio is equal to a pressure drop across the fluid regulator at a max flow rate divided by a pressure drop across the fluid regulator at a min flow rate and P1 ratio is equal to an upstream pressure at a max flow rate divided by an upstream pressure at a min flow rate.

26. The method of claim 1, wherein the step of generating a second characterization of a second fluid regulator flow of the fluid regulator relative to the control signal is without monitoring performance of the fluid regulator as the fluid regulator operates in connection with one or more test fluid flows.

27. The method of claim 11, wherein the second characterization is made without monitoring performance of the fluid regulator as the fluid regulator operates in connection with one or more test fluid flows.

* * * * *